United States Patent [19]

Spratt et al.

[11] Patent Number: 4,554,547
[45] Date of Patent: Nov. 19, 1985

[54] RANGE PROCESSOR FOR DME

[75] Inventors: Brendan J. Spratt, Boca Raton; David J. Pryor, N. Lauderdale; James B. Jones, Jr., Deerfield Beach; Dennis W. Davis, Boca Raton, all of Fla.; Richard V. Frazier, Jr., Boulder Heights, Colo.

[73] Assignee: Allied Corporation, Morristown, N.J.

[21] Appl. No.: 449,064

[22] Filed: Dec. 13, 1982

[51] Int. Cl.⁴ .............................................. G01S 13/08
[52] U.S. Cl. ..................................... 343/7.3; 343/12 R
[58] Field of Search ................... 343/5 LS, 5 GC, 7.3, 343/17.1 R, 12 R

[56] References Cited

U.S. PATENT DOCUMENTS 3,900,848 8/1975 Mears ..................................... 343/7.3
4,028,698 6/1977 Miller et al. .................. 343/6.5 LC
4,124,850 11/1978 Frazier, Jr. et al. .......... 343/6.5 LC
4,355,312 10/1982 Bosi et al. ............................. 343/7.3

Primary Examiner—Thomas H. Tarcza
Assistant Examiner—K. R. Kaiser
Attorney, Agent, or Firm—Bruce L. Lamb

[57] ABSTRACT

A range processor for airborne distance measuring equipment in which coherency of reply signals from the ground based DME station is determined by incrementing the contents of storage locations of a random access memory device for each reply signal according to the time of reception of the reply signal and for decrementing the contents of the storage location if no reply signal is received. Whenever the contents of a storage location exceeds a threshold value a range gate is generated so that the next reply received within the range gate causes the time of reception of the reply to be stored as range data.

8 Claims, 11 Drawing Figures

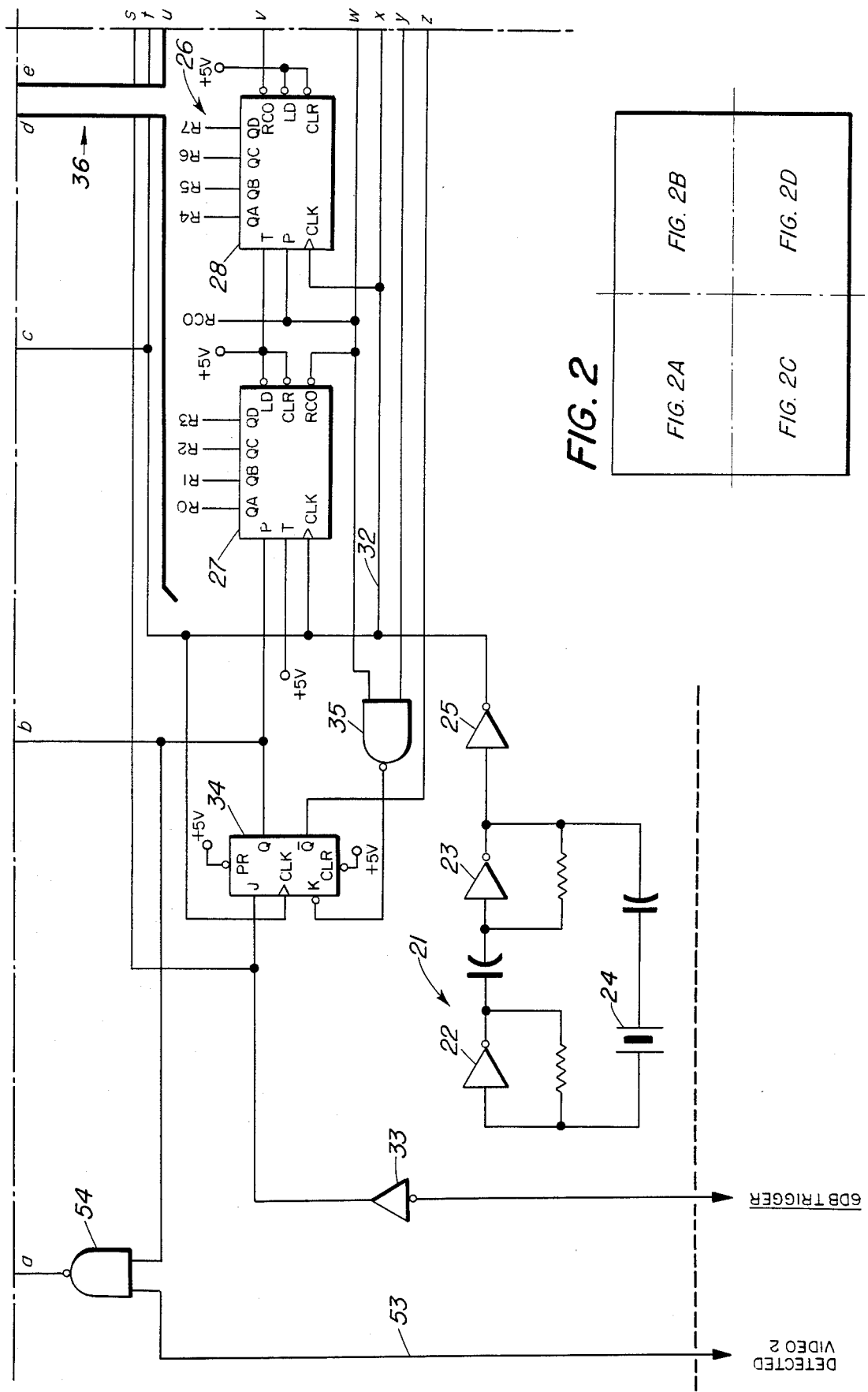

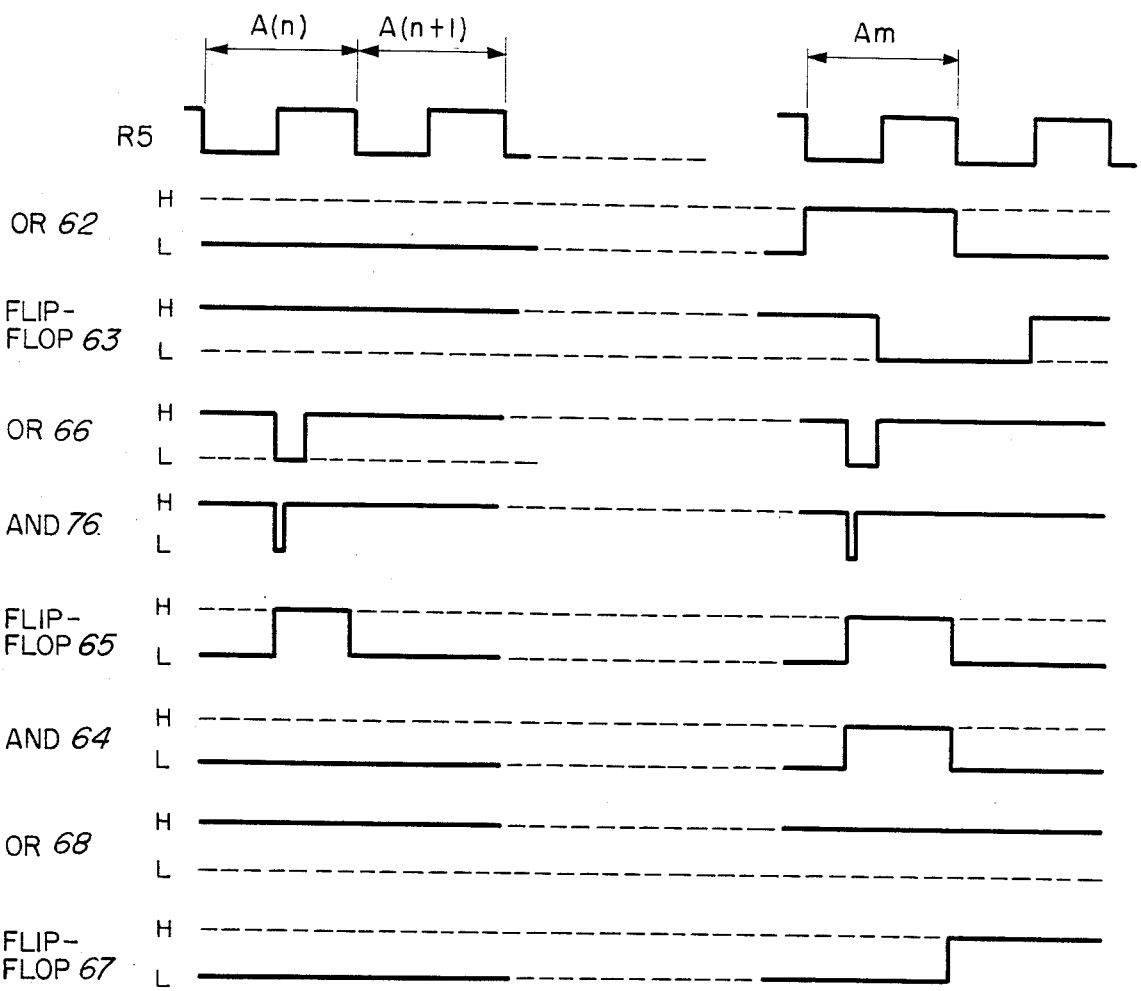

RANGE PROCESSOR FOR DME

The present invention relates to distance measuring equipment (DME) for aircraft. More particularly, it relates to a range processor for use in DME which is capable of rapidly distinguishing true replies by a ground-based responser station to aircraft interrogation signals from false replies caused by echoes, by responser replies to interrogation signals from other aircraft and by random signals transmitted by the responser.

Distance Measuring Equipment utilizing analog type signal processing circuits has been in commercial use for a number of years. More recently, the advantages inherent in digital signal processing circuits have been more or less successfully attained by several techniques. Such advantages include more rapid acquisition of valid reply signals and more accurate measurement of distance.

Since a ground station replies to all interrogation signals with pulse pairs having the same pulse spacing and on the same transmitted frequency it is only possible for each aircraft to identify replies to its own interrogation signals by establishing coherency between its interrogation signals and successive reply signals. Coherency is established by determining that certain of the reply signals received during successive interrogation cycles are grouped at a constant time of reception following transmission of the interrogation signals, thereby indicating to a high degree of probability that such grouped replies are valid responses.

The time required for the determination of the coherency of reply signals, often referred to as the signal acquisition or search time, is an important characteristic of airborne DME. The search time is always desirably as short as possible. In station scanning type equipment where distance measurements are made in rapid succession between an aircraft and several different ground stations, for use in an on-board navigational system, it is of vital importance that the search time be reduced to a minimum.

In U.S. Pat. No. 4,028,698, issued June 7, 1977 to Miller et al for DME Apparatus and Method, there is disclosed a range processor employing digital means to establish coherency of replies and hybrid analog-digital means for generating a range gate after valid replies are located. The Miller et al system utilizes a shift register as a recirculating memory into which reply signals from a first interrogation cycle are loaded. Then such replies are shifted out to determine the time coincidence thereof with reply signals received during a second and a third interrogation cycle. If coincident replies are found during both the second and third interrogation cycles, the system is switched from the search mode to the track mode and thereafter coincidence of replies is required for only 50% of the interrogation cycles.

In the present invention, coherency of reply signals is established by loading the replies into a random access memory at address locations corresponding to successive segments of range. A reply present for any particular range results in adding a value of two to the contents of that range bin. If a reply is missing in a succeeding interrogation cycle at a range bin which has been previously incremented, the contents of that bin are decreased by a value of one. When the contents of a bin exceed a digital threshold, of value six in the preferred embodiment, validity of replies at that range bin is established.

As a minimum, the present invention requires three interrogation cycles to establish coherency of replies, just as in the Miller et al system, under the most favorable circumstances. However, if conditions were such that a reply was missing at every alternate interrogation cycle, the Miller et al system would never succeed in establishing the coherency of the alternately present replies, while this invention would establish such coherency after six interrogation cycles.

It is an object of the present invention to provide a range processor for airborne DME which is capable, under unfavorable circumstances, of identifying true ground station replies to interrogation signals in a minimum amount of time.

It is another object of the invention to provide a range processor for airborne DME employing entirely digital circuit means for improved reliability and accuracy.

Other objects and advantages of the invention will become apparent as a complete understanding thereof is gained through study of the following complete description and the accompanying drawings.

BRIEF DESCRIPTION

Briefly, the present invention comprise a digital range processor for distance measuring equipment including a clock, a control counter, a random access memory (RAM) device, a precision shift register and associated logic circuits. The control counter begins a summation of clock pulses at the beginning of each interrogation cycle when the transmitter interrogation pulse reaches fifty percent of its peak amplitude. The time interval following an interrogation pulse is divided by the control counter into 1024 periods, each of 6.2 us duration. These periods may be regarded as a series of contiguous range bins of one-half nautical mile width. When a pulse is received at the processor and decoded as being a valid reply from the ground responser, a count of two is added to the particular range bin corresponding to the time of receipt of the reply. If no reply is received during the period a range bin is enabled, a count of one is subtracted from the contents of that particular range bin. Thus, for each range bin following an interrogation, there is a count of the number of accumulated replies which have occurred in that range bin over a number of preceding successive interrogations. When no coherent replies are present, the accumulation of random replies tends toward zero. When coherent replies are present, the accumulation increases in value until a digital threshold is exceeded. At that time, a range gate window is generated which is centered on the range bin containing the excess count.

To determine the actual range, a precision high-speed shift register is parallel-loaded with the running count accumulated by the control counter. Until a range gate is generated, output from the shift register is blocked. When a range gate is generated, the first reply to appear within the gate stops further loading of the shift register at the count corresponding to the time of reception of the reply. At the end of the interrogation cycle, the contents of the shift register are unloaded into a microprocessor where the data is corrected for known fixed delays, filtered and converted to units of distance for display or other utilization.

DESCRIPTION OF THE DRAWINGS

FIGS. 4A, 4B, 4C and 4D are timing diagrams helpful in explaining operation of the range gate and data output functions of the invention under conditions of, respectively, reception of a reply for a range bin which has not accumulated replies in excess of the digital threshold; reception of a reply for a range bin which has accumulated replies in excess of the threshold; reception of a reply one-half a range bin preceding range bin $A_m$ which has accumulated replies in excess of the threshold; and reception of a reply one-half a range bin following range bin $A_m$ which has accumulated replies in excess of the threshold.

DETAILED DESCRIPTION

Figure 1:
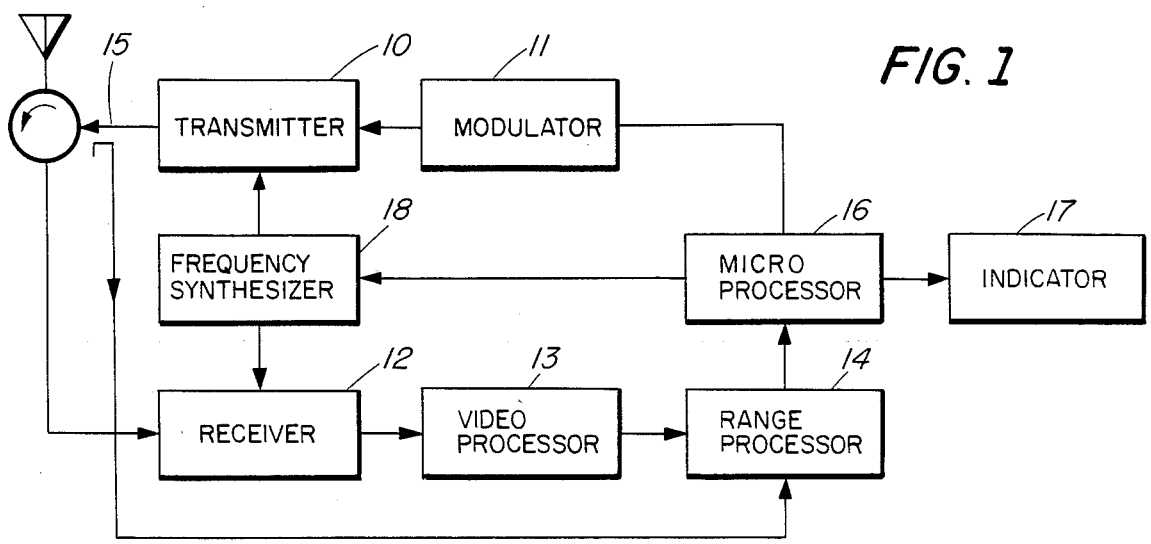
FIG. 1 is a simplified block diagram of an airborne DME system.

FIG. 1 is a simplified block diagram of an airborne interrogator for DME. A transmitter 10 operates in the L-band at frequencies between 1025 and 1150 MHz. The transmitter may be tuned to one of 126 channels within the frequency band, which channels are further subdivided into X and Y channels, to provide selective operation of the interrogator with one of a possible total of 252 ground-based responser stations. The transmitter is pulse modulated by a modulator 11 which generates pairs of pulses, spaced at either 12 us for X channel operation, or at 36 us for Y channel operation, at a repetition rate of 30 pulse pairs per second.

Upon receipt of an interrogation pulse pair and after a fixed delay of 50 us, the ground-based responser replies with a pulse pair spaced at 12 us for X channel or 30 us for Y channel on a frequency 63 MHz above or below the interrogation frequency, depending upon whether the responser is operating as an X or Y channel station.

The reply pulse pair received by the interrogator receiver 12 operating in the frequency band of 962–1213 MHz, is detected and tested for validity in a video processor 13. Video processor 13 checks the received pulses for proper width, spacing and amplitude. When a valid reply is found to be present, a signal is passed to the range processor 14.

The range processor uses the input from the video processor to perform three primary functions: location of coherent replies, rejection of echo responses, and computing time delay measurements. The range processor commences time measurements upon detection of an interrogation pulse by a transmitter power detector 15. Each responser transmission received by receiver 12 and validated by video processor 13 is stored in random access memory (RAM) of the range processor at an appropriate one of 1024 locations, corresponding to the time of the appearance of the output signal from video processor 13. Outputs from the video processor 13 will include replies of the responser to interrogations by other aircraft, valid replies to interrogations by this aircraft, echoes of such valid replies and random squitter pulses transmitted by the responser which occur even in the absence of reception of interrogation pulses by the responser.

When the accumulated replies in any particular range bin reach a predetermined digital threshold, the next valid reply to occur within that range bin causes a measurement of the time of occurrence of the reply to be stored and a range ready status signal to be transmitted to a microprocessor 16. Microprocessor 16 converts the time measurement from range processor 14 into range data by subtracting certain known delays from the time measurement. Range data from the microprocessor is then transmitted to an indicator 17 for visual display or to other navigational instruments (not shown) for additional uses.

In addition to computing range data from the time measurements produced by range processor 14, microprocessor 16 is responsible for control of a frequency synthesizer 18 which determines the operating frequency of transmitter 10 and receiver 12 and for control of the spacing of the pulse pairs generated by modulator 11 to establish X or Y channel operation for the interrogator.

Figure 2A:
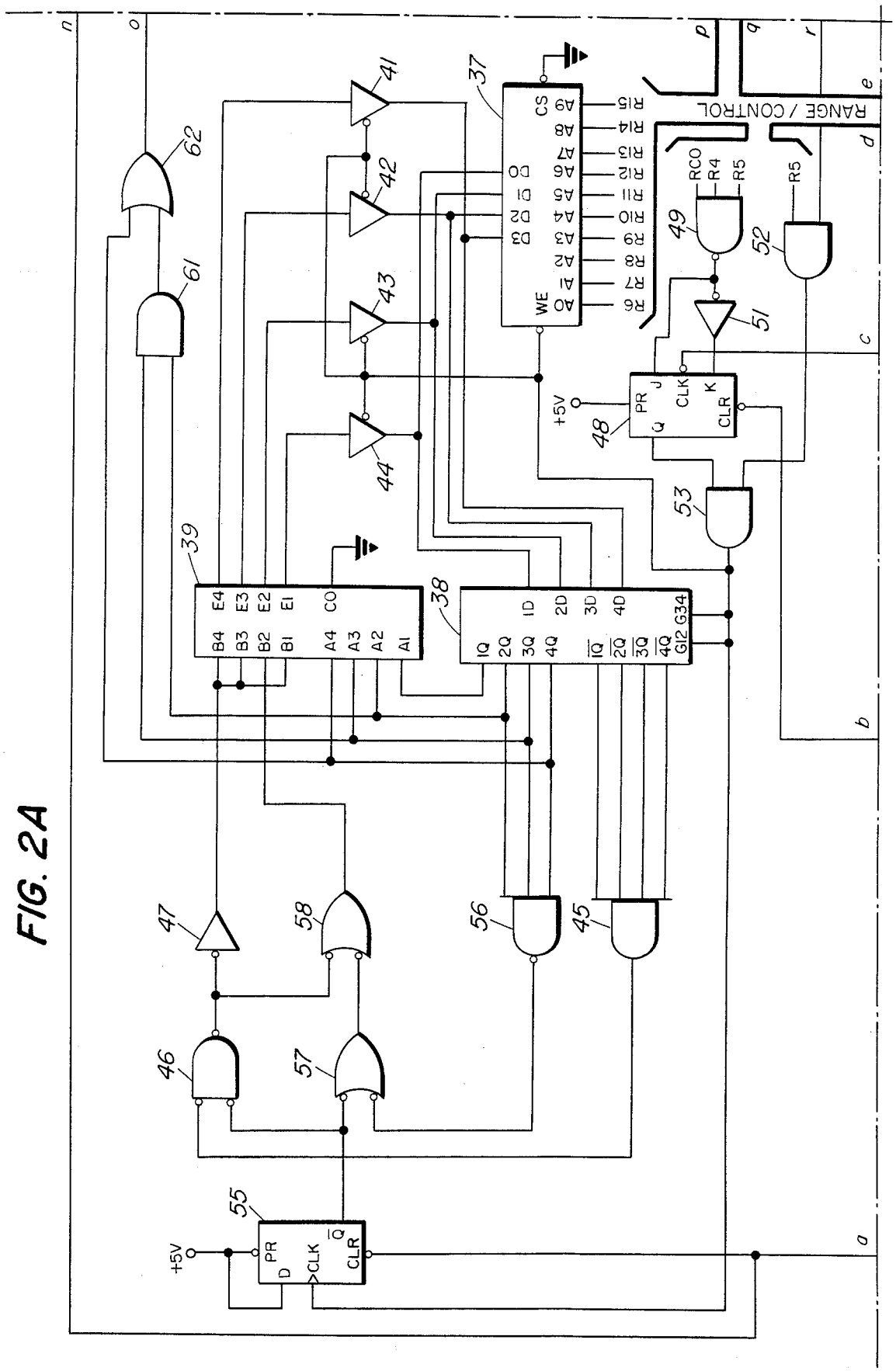
FIG. 2 is a keying diagram, showing the order of assembly of FIGS. 2A-2D and FIGS. 2A-2D, assembled is a diagram, generally schematic in form, showing the range processor of the invention.
Figure 2B:
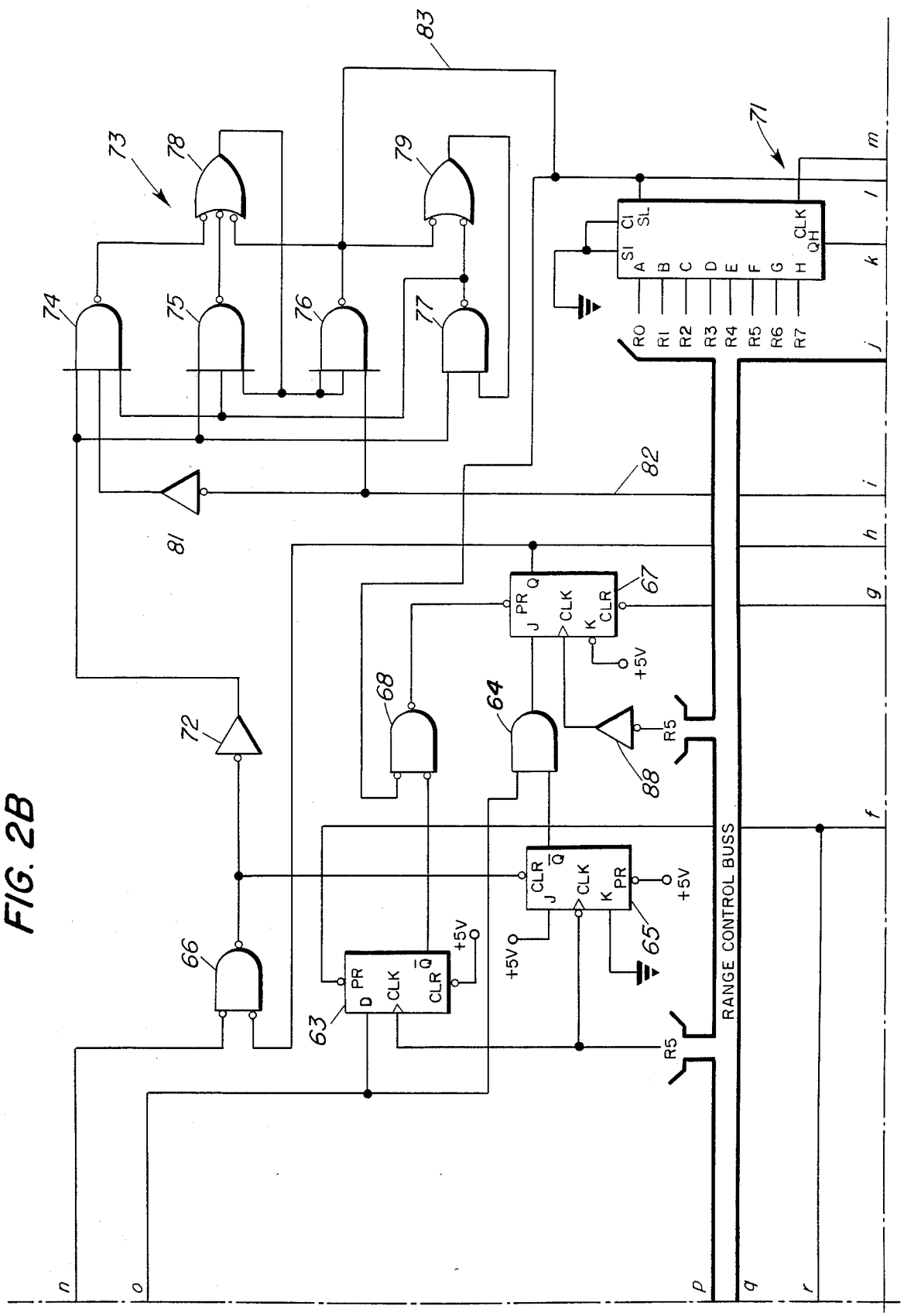
Figure 2D:
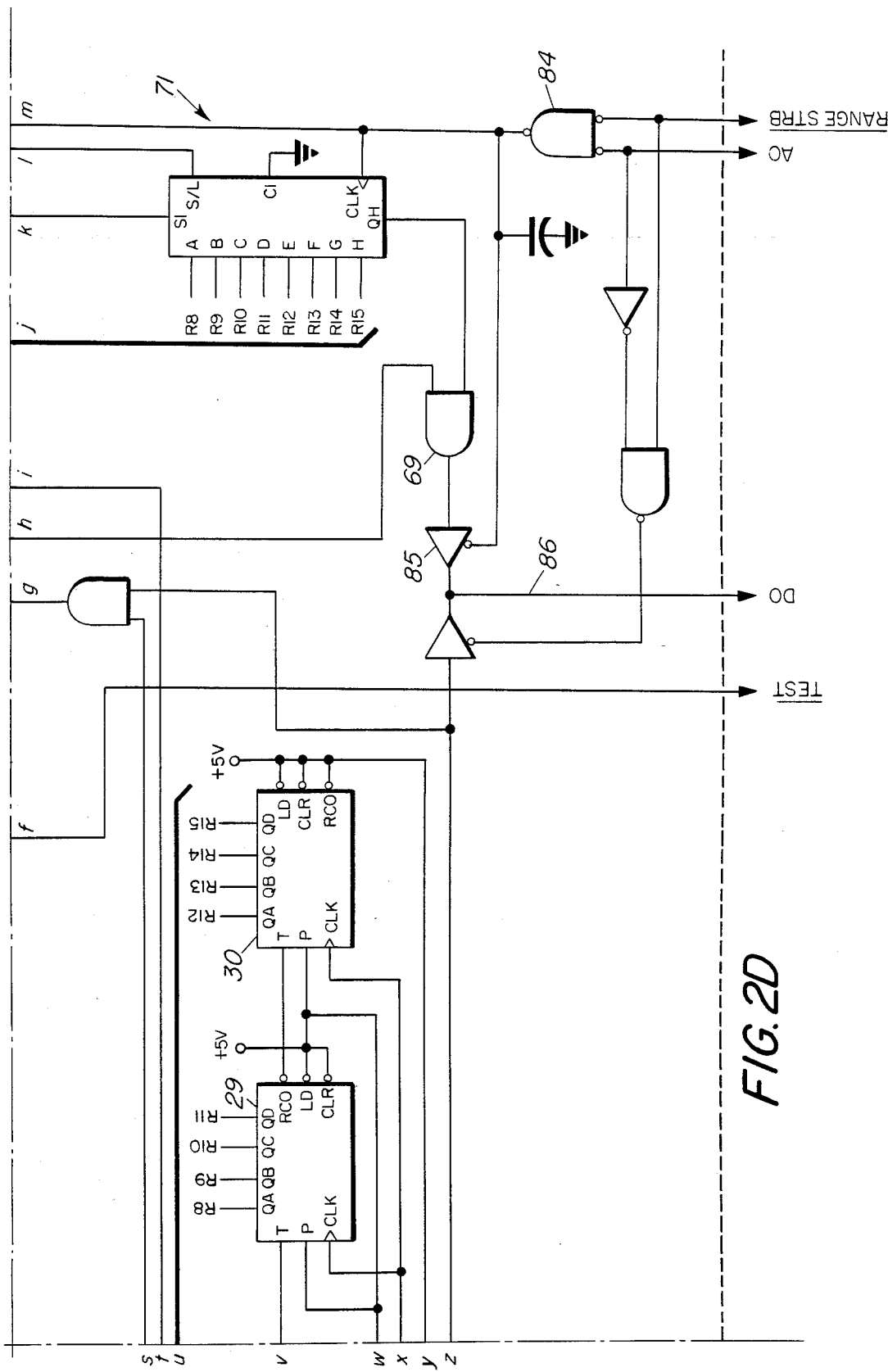

The range processor 14, which is the subject of the present invention, is shown in schematic form in FIG. 2. A crystal controlled clock oscillator 21 is comprised by inverters 22, 23 connected in positive feedback relationship with a crystal 24 ground to oscillate at a frequency of 10.3568 MHz. The output of clock oscillator 21, buffered by an inverter 25, is counted by a 16-bit synchronous counter 26 formed of four cascaded 4-bit counters 27–30, which are clocked from the common clock bus 32. Counter 26 begins operation upon the appearance of a pulse from power detector 15 (FIG. 1) indicating transmission of an interrogation pulse. This negative going pulse is inverted by inverter 33 and applied as a positive J input to J-K flip-flop 34. The Q output of flip-flop 34 is thereby set to a positive level which enables input P of counter 27. The Q output of flip-flop 34 remains at a high level until carry-out occurs from counter 30. Carry-out from counter 30 occurs when counter 26 has attained maximum count of 65, 535 clock pulses. Then, the succeeding clock pulse causes overflow, or carry-out, from counter 30 which is passed by NAND gate 35 to the $\overline{K}$ input of flip-flop 34, resetting the Q output thereof to low level. The data outputs QA–QD of counter stages 27–30 are respectively connected to individual lines R0–R15 of a 16-bit range/control bus 36. Data on bus 36 controls storage of replies received from the ground responser at appropriate addresses in RAM and provides time measurement data for use by the microprocessor.

The range bins in which the responser replies are stored are provided by a 1024×4-bit static RAM 37, a 4-bit latch 38, a 4-bit full adder 39 and tri-state buffers 41–44. Addresses A0–A9 of the RAM are accessed by digits R6–R15 of the output of range counter 26. The 4-bit data outputs D0–D3 are connected to inputs 1D–4D of latch 38. Outputs $\overline{1Q}$–$\overline{4Q}$ of latch 38 are respectively connected to inputs A1–A4 of adder 39 and complementary outputs 1Q–4Q are connected through AND gate 45, OR gate 46 and inverter 47 as a common input to inputs B1, B3 and B4 of adder 39. The sum outputs E1–E4 are respectively connected through buffers 41–44 to the data input/output connections D0–D4 of RAM 37. The read/write operation of RAM 37 and enablement of latch 38 are controlled by a J-K negative edge triggered flip-flop 48. J and K inputs to flip-flop 48 are provided by NAND gate 49 which combines the R4–R5 outputs of counter 26 with the ripple carry-out output of counter stage 27, and by inverter 51. Counter output R5 is combined with a normally high $\overline{\text{TEST}}$ signal in AND gate 52. The output of gate 52 is combined with the Q output of flip-flop 48 in NAND gate 53, the output of which controls latch 38, buffers 41–44 and the read/write operation of RAM 37, as later described.

Valid responser replies appearing on lead 53 from video processor 13 are combined with the enabling output of flip-flop 34 in NAND gate 54 which supplies CLR input to a D-type positive edge triggered flip-flop 55. Output $\overline{Q}$ is combined with the output of AND gate 45 in OR gate 46 and with the output of NAND gate 56 in NAND gate 57. The outputs of gates 46 and 57 are combined in NAND gate 58 which furnishes input B2 to adder 39.

The purpose of latch 38, adder 39 and gates 45–47 and 56–58 is to add the quantity two to the contents of a range bin when a responser reply is received, to subtract the quantity one from the contents of a range bin if no reply is received during the time a range bin is addressed, and to leave unaltered the range bin contents if they are at zero and no reply is received or if the contents are fourteen or fifteen and a reply is received. Storage of responser replies in RAM is as follows.

Counter 26, enabled by high Q output from flip-flop 34 upon transmission of an interrogation signal counts 10.3568 MHz clock pulses beginning with the 16-bit number:

| R15 | R14 | R13 | R12 | R11 | R10 | R9 | R8 | R7 | R6 | R5 | R4 | R3 | R2 | R1 | R0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| (HEX) 0 | | | | 0 | | | | 0 | | | | 0 | | | | and ending with:

| R15 | R14 | R13 | R12 | R11 | R10 | R9 | R8 | R7 | R6 | R5 | R4 | R3 | R2 | R1 | R0 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| (HEX) F | | | | F | | | | F | | | | F | | | |

RAM 37 is addressed by the more significant digits R6 . . . R15. All of the more significant digits R6 . . . R15 remain zero until counter 26 has accumulated 64 (decimal) clock pulses. Thereafter each of the more significant digits R6 . . . R15 will be incremented only upon accumulation of 64 (decimal) additional clock pulses. Addresses A0 . . . A9 of RAM 37 are therefore addressed in binary sequence at intervals of 6.179 us corresponding to 0.5 nm segments of range. (12.359 $\mu$s=1.0 nm). RAM 37 contains 1024 address locations, each of which constitutes 1 range bin, so that responser replies can be stored in appropriate range bins up to a maximum range of 512 nm. When a responser reply appears on line 53, the output of gate 54 goes low, causing immediate reset of flip-flop 55 and a high signal at the $\overline{Q}$ output thereof. If the content of the RAM location then being addressed is zero the output of gate 45 will be high, gate 46 output is high, gate 47 output is low causing digits B1, B3 and B4 to be zero; gate 57 output is low and gate 58 output is high causing digit B2 to be high (one), thereby adding the quantity two (decimal) to the RAM contents at that particular location.

If no responser reply is received during the time a RAM location is being addressed and the content at that address is zero, the $\overline{Q}$ output of flip-flop 55 will remain low, the outputs of gates 45, 46 and 56 are all high but gate 57 output then becomes high. The outputs of inverter 47 and gate 58 are both low with the result that digits B1, B3, B4 and B2 are all zero, so that the contents at that RAM location remain zero.

If during previous interrogations responses have been received during the time a particular RAM location is being addressed, the contents at that address will be some number between one and fifteen. Assuming the contents are any number from one to thirteen, inclusive, and a response is received, the $\overline{Q}$ output of flip-flop 55 will be high, gate 45 output is low, gate 46 output is high and gate 57 output is low. The output of inverter 47 is low and gate 58 output is high, thereby adding the quantity 2 (decimal) to the contents at that memory location. If the memory contents are 14 or 15 and a response is received, gate 45 output is low, gate 46 output is high, but gate 56 output is low and gate 57 output is high. The result is that the outputs of both inverter 47 and gate 58 are low, adding zero to the contents.

If a RAM location being addressed contains any number from one to fifteen, inclusive, and no response is received during the time that location is addressed, the output Q of flip-flop 55 remains low. The outputs of gates 45 and 46 are both low, the output of gate 57 is high, regardless of the state of the output of gate 56, and the outputs of inverter 47 and gate 58 will both be high. The result is that digits B1, B3, B4 and B2 are all 1, adding the binary number 1111 to the contents at that memory location. This operation subtracts the quantity 1 from the memory contents by the twos complement method.

A negative edge triggered J-K flip-flop 48, NAND gates 49, 53, inverter 51 and AND gate 52 control the read/write operation of RAM 37. High output from gate 53 causes RAM 37 to be in the read mode and disables tri-state buffers 41–44. Data stored at a bin address, $A_m$, is then available at outputs D0–D3 of RAM 37 and such data will also appear at outputs $\overline{1Q-4Q}$ and the complements thereof at outputs 1Q-4Q of latch 38.

Figure 3:
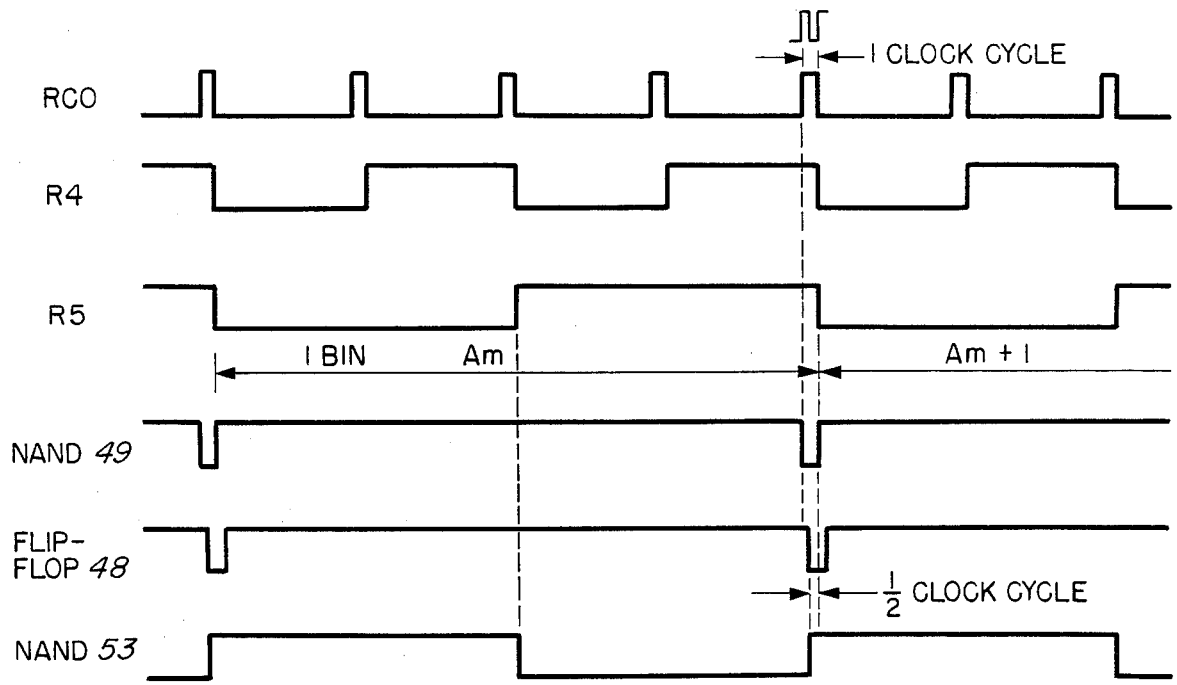
FIG. 3 is a timing diagram useful in explaining control of the read/write modes of operation of random access memory used in the invention.

Each of the 1024 RAM locations is addressed at the beginning of a low R5 half cycle and the address is not advanced until a full R5 cycle is completed. Referring to the timing diagram of FIG. 3, and selecting an arbitrary address $A_m$ which can represent any value of counter 37 output R6–R15 from zero to FFFF (hex), bin $A_m$ is first addressed when R5 drops low and this address continues until the next negative-going transition occurs, at which time address $A_m$ is incremented for access to the next in order bin, $A_{m+1}$.

Low R5, combined with a normally high $\overline{TEST}$ input in AND gate 52 produces a low gate 52 output. Low gate 52 output causes the output of gate 53 to be high, regardless of the state of the Q output of flip-flop 48. High gate 53 output places RAM 37 in the read mode and disables tri-state buffers 41–44. While output from gate 53 is high, the values read at data outputs D0–D3 of RAM 37 appear directly at outputs $\overline{1Q-4Q}$ of latch 38. At the center of bin $A_m$, R5 goes high causing gate 53 output to drop low. Low output from gate 53 latches into latch 38 the D0–D3 values of RAM 37 present just prior to the R5 transition, enables tri-state buffers 41–44 and places RAM 37 in the write mode.

During the period bin $A_m$ is addressed, except for one half clock cycle preceding the end of address $A_m$, if a detected video pulse appears, or if no detected video pulse appears, the contents of bin $A_m$ accumulated during previous interrogation cycles, incremented or decremented as appropriate for the current interrogation cycle, will appear at the E1–E4 outputs of adder 39. These E1–E4 outputs will be written into RAM location $A_m$ as the updated contents beginning at the center of address period $A_m$, when gate 53 output drops low and continuing until just prior to the end of address period $A_m$. RAM 37 must be in the read mode at the time the address thereto is changed to prevent the entry of erroneous data. It is the function of NAND gate 49 and flip-flop 48 to end the write mode of RAM 37 just prior to the address change. A ripple carry out (RCO) positive polarity pulse of one clock cycle duration is generated each time counter stage 27 reaches full capacity, or every sixteen clock cycles. The RCO output of counter stage 27, together with the R4 and R5 outputs of counter stage 28 provide the inputs to NAND gate 49. Gate 49 output drops low when all inputs thereto are high, one clock cycle preceding the end of bin address $A_m$. The low output from gate 49, applied to the J input of flip-flop 48 and inverted by 51 for the K input to flip-flop 48, conditions flip-flop 48 for high to low transition when the negativegoing edge of the clock pulse appears, one-half clock cycle before the end of address $A_m$. The low output from flip-flop 48 and high R5 generates high output from NAND gate 53 ending the write mode of RAM 37 at address $A_m$ one-half clock cycle before R5 drops low to generate the next bin address $A_{m+1}$.

As each location in RAM is addressed, the contents are decoded by AND gate 61 and OR gate 62. When the value of such contents is 6 (decimal) or greater the output of gate 62 will be high. A high output from gate 62 opens a range gate so that a responser reply which occurs within the time interval allocated to that particular RAM address, or range bin, causes the value of the output of range counter 26 at the precise time of the reception of the reply to be stored in a shift register and made available to the microprocessor 16 (FIG. 1) as valid range data. Similarly, a response within a time corresponding to one-half range bin immediately preceding or following the range gate causes the precise range count to be stored in the shift register and made available to the microprocessor as valid range data. The range gate is generated by the elements next to be described.

The output of gate 62 is connected to the D input of a D-type positive edge triggered flip-flop 63 and to one input of AND gate 64. The clear input of flip-flop 63 is connected to a positive voltage source and the preset input thereof is normally high. The $\overline{Q}$ output of a J-K negative edge triggered flip-flop 65 supplies a second input to AND gate 64. The J and preset inputs of flip-flop 65 are connected to the positive voltage source and the K input thereof is grounded. The output of NAND gate 54 is connected to one input of an OR gate 66. The clear input to flip-flop 65 is from the output of gate 66. Gate 64 provides the J input to a J-K type positive edge triggered flip-flop 67. The K input to flip-flop 67 is connected to the positive voltage source and the preset input thereof is from an OR gate 68. The Q output of flip-flop 67 provides a second input to OR gate 66 and one input to an AND gate 69.

A 16-bit parallel-load shift register 71 receives inputs R0 ... R15 from range counter 26 through range bus 36. OR gate 66 through an inverter 72 controls a synchronizing circuit 73 which comprises NAND gates 74–79 and inverter 81. 10.3568 MHz clock pulses are applied as one input to NAND gate 76 and from inverter 81 as one input to NAND gate 74. When a detected video pulse appearing as a negative pulse from gate 54 passes through OR gate 66, the other input to which will normally be low, a positive pulse appears at the output of inverter 72 for application to synchronizing circuit 73. When enabled by the positive pulse output from inverter 72, sync circuit 73 operates to pass the next to appear positive clock pulse on line 82 as a negative pulse on line 83. Only one such pulse will be passed during the time the output of inverter 72 remains high. The negative pulse on line 83 causes the value of the range count then present on range bus 36 to be loaded into shift register 71. The contents of shift register 71 are unloaded serially by strobe pulses from microprocessor 13 passing through OR gate 84. The output of shift register 71 is transmitted through AND gate 69, if gate 69 is enabled, and tri-state buffer 85 to D0 line 86.

Whatever may be the contents of shift register 71, no data is transmitted through gate 69 so long as the Q output of flip-flop 67 remains low. Flip-flop 67 will not be triggered into a high state until a response is received within a range gate or within a time preceding or following a range gate corresponding to one-half the width of the range gate.

Figure 4C:
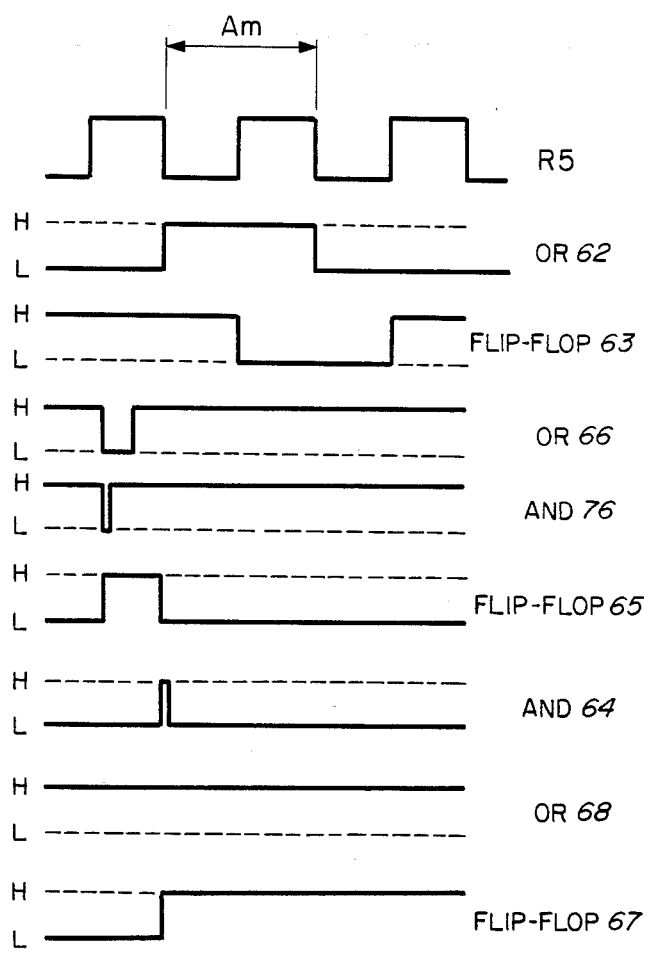

Range gate operation will best be understood by reference to the timing diagrams of FIGS. 4a through 4d. FIG. 4a shows the receipt of a response pulse at a time when the range bin then being addressed has not accumulated sufficient replies to exceed the digital threshold established by gates 61 and 62. One full cycle of range counter output R5 constitutes one range bin. Range bin $A_n$ is addressed at the trailing edge of an R5 pulse and continues to be addressed until the next R5 trailing edge appears. The address to RAM 37 will then be incremented so that range bin $A_{n+1}$ is addressed during the next full cycle of R5. Since neither of the range bins $A_n$ or $A_{n+1}$ have accumulated sufficient responses, the output of OR gate 62 which is also the D input to flip-flop 63 remains at a low level during this time so that the $\overline{Q}$ output of flip-flop 63 is at a high level. A detected video response appearing on line 53 passes through gate 54 as a negative pulse and appears at the output of OR gate 66 as a negative pulse. Inverter 72 applies this pulse to sync circuit 73 which produces a single negative clock pulse at the output of AND gate 76 (line 83). The negative clock pulse on line 83 causes the range counter output R0 ... R15 then present on bus 36 to be loaded into shift register 71. At the same time the low output of gate 66 clears flip-flop 65 resetting the $\overline{Q}$ output thereof high. The next negative-going R5 pulse to appear sets the $\overline{Q}$ output of flip-flop 65 low since by this time the output of gate 66 is again high. AND gate 64 remains at a low level through these events because the output of gate 62 is at a low level. OR gate 68 remains at a high level through these events since the output of flip-flop 63 continues at a high level. With the J input to flip-flop 67 low and the preset input thereto high, clock pulses produce no change in the output. Hence, flip-flop 67 remains at a low level, disabling gate 69 and permitting detected video pulses which may later appear in the interrogation cycle to pass through gate 66.

FIG. 4b illustrates events when a range bin $A_m$ is addressed which has received a sufficient number of responses to open the range gate. When this bin is addressed the output of OR gate 62 goes high, placing a high on the D input to flip-flop 63 and qualifying AND gate 64. The next positive-going R5 pulse clocks flip-flop 63 causing the $\overline{Q}$ output thereof to drop low, thereby enabling gate 68. When a detected video response appears as a negative pulse through OR gate 66, the single negative pulse does not pass through gate 68, since this gate is not yet enabled by flip-flop 63. However, gate 64 has been enabled by the high output of gate 62 so that the high $\overline{Q}$ output of flip-flop 65, reset by the low output of gate 66, passes through AND gate 64 to cause the J input to flip-flop 67 to be high. Flip-flop 67 is triggered by positive going clock pulses but inverter 88 synchronizes the flip-flop with the trailing edges of R5 pulses. Consequently, with the J input thereto high flip-flop 67 is triggered high at the trailing edge of R5, cutting off the transmission of later appearing detected video responses through gate 66 and enabling gate 69.

FIG. 4c illustrates receipt of a response within one-half range bin preceding a range bin $A_m$ which has received a sufficient number of pulses to exceed the digital threshold. Upon receipt of the response, OR gate 66 drops low. This occurs within the positive half-cycle of R5 preceding range bin $A_m$. When range bin $A_m$ is addressed, the output of OR gate 62 becomes high. In the meantime, the low output of gate 66 has generated the single clock pulse at the output of AND gate 76, causing shift register 71 to be loaded with the range count at the time of receipt. The low from gate 66 has also cleared flip-flop 65, causing the $\overline{Q}$ output thereof to go high. $\overline{Q}$ output of flip-flop 65 remains high until the next trailing edge of R5 appears. When range bin $A_m$ is addressed the high outputs of gate 62 and flip-flop 65 produce a high output from AND gate 64, causing the J input of flip-flop 67 to be high, causing flip-flop 67 to be triggered high, thereby blocking transmission of later received responses through gate 66 and enabling gate 69 to permit read-out of the range count stored in shift register 71 at the time of generation of the clock pulse through gate 76.

Figure 4D:
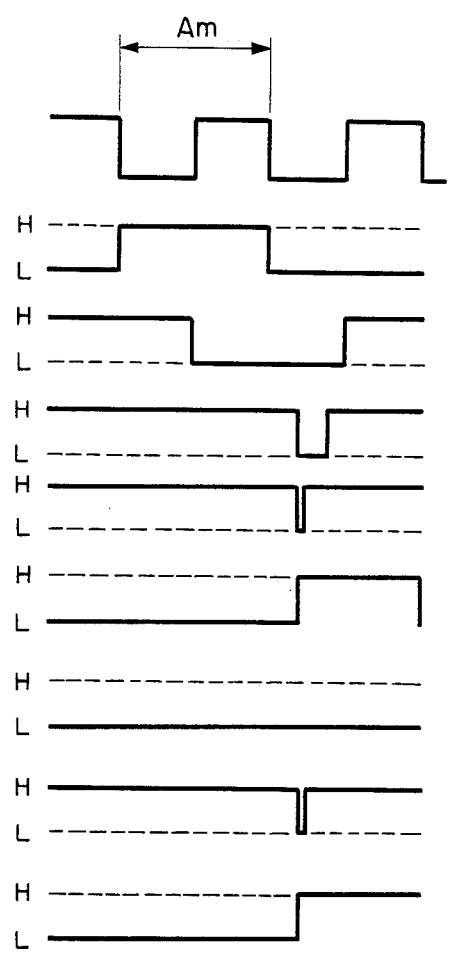

FIG. 4d illustrates receipt of a response within one half range bin following range bin $A_m$ which has received sufficient responses to exceed the digital threshold. The received response pulse causes the output of OR gate 66 to drop low and results in the transmission of a single clock pulse by AND gate 76, loading shift register 71 with the output value of range counter 26 existing at that moment. OR gate 62, high during the time range bin $A_m$ is addressed, has in the meantime caused the Q output of flip-flop 63 to be low. This low output continues until the leading edge of the positive half cycle of R5 appears during the range bin following $A_m$. Low output from flip-flop 63 qualifies OR gate 68 so that when the clock pulse appears from gate 76 the output of gate 68 drops low, presetting the Q output of flip-flop 67 high, cutting off further transmission of pulses through OR gate 66 and qualifying AND gate 69 for the transmission of serial output data from shift register 71.

The invention claimed is:

1. A range processor for airborne distance measuring equipment, comprising,
    a source of clock pulses;
    means providing a trigger signal indicating transmission of an interrogation signal by said distance measuring equipment;
    a counter for accumulating a continuous binary count of said clock pulses, the operation of said counter being initiated by said trigger signal;
    first memory means having a plurality of separate storage locations each of which is addressed by a particular output count of said counter;
    means for detecting reception of a reply signal by a ground station to an interrogation signal by said distance measuring equipment;
    first logic means for incrementing the contents of one of said storage locations being addressed when a reply signal is detected and for decrementing the contents of said storage location when no reply signal is detected;
    second memory means for storing the output count of said counter said second memory means being of the parallel load type; and
    second logic means controlling said second memory means for loading said output count in parallel into said second memory means when a reply signal is detected and for blocking output from said second memory means until the contents of the storage location being addressed at the time of detection of said reply signal exceed a predetermined threshold.

2. A range processor as claimed in claim 1 wherein said second logic means includes:
    means for generating a range gate signal when one of said storage locations of said first memory means is addressed and the contents thereof equal or exceed a predetermined numerical value;
    means for determining reception of a first reply signal within a predetermined time of the appearance of said range gate signal; and
    means controlled by said last-named means for preventing loading in said second memory means of said output count when a second reply signal is detected later than said first reply signal.

3. A range processor as claimed in claim 2 wherein said first logic means when operating to increment the contents of one of said storage locations adds a first number to said contents and when operating to decrement the contents of one of said storage locations subtracts a second number from said contents, said first number being greater than said second number.

4. A range processor as claimed in claim 3 wherein said first logic means is operative to decrement the contents of one said storage locations being addressed only when said contents are greater than zero.

5. A range processor as claimed in claim 3 wherein each of said storage locations of said first memory means is of limited capacity and wherein said first logic means is operative to increment the contents of one of storage locations being addressed only when the sum of said first number and said contents is within said capacity.

6. In airborne distance measuring equipment including a transmitter for transmitting interrogation signals to a ground based station and a receiver for receiving reply signals from said ground based station, a range processor comprising,
    a source of clock pulses;

means providing a trigger signal indicating transmission of an interrogation signal by said distance measuring equipment;

a counter for accumulating a continuous count of said clock pulses, the operation of said counter being initiated by said trigger signal said counter providing a multiple bit binary digital output in parallel format;

means providing a detected video signal upon receipt by said distance measuring equipment of a reply signal from said ground based station;

first memory means of the random access type including a plurality of storage locations, said storage locations being addressed sequentially by accumulated count from said counter;

logic means for incrementing the contents of the particular storage location of said first memory means being addressed whenever said detected video signal appears and for decrementing the contents of said particular storage location being addressed if no detected video signal appears;

second memory means of the parallel load type for storing the output count of said counter;

means for loading in parallel into said second memory means said output count of said counter existing at the time of appearance of each said detected video signal;

means for generating a range gate signal whenever the contents stored at a particular location of said first memory means exceeds a threshold value;

means controlled by said range gate signal for preventing storage by said second memory means of output count of said counter for detected video signals appearing later than said range gate signal; and means for blocking output from said second memory means until said range gate signal has been generated.

7. A range processor as claimed in claim 6 wherein said random access memory device is addressed by the higher order digits of said counter output with each storage location of said memory device being addressed for a period equal to the time required for said counter to accumulate a sufficient number of said clock pulses to increment the least significant digit of said higher order digits.

8. A range processor as claimed in claim 7 wherein said means controlled by said range gate signal for preventing storage includes, a logic element settable to a high logic state by said detected video signal for a period not greater than one-half the period during which each storage location of said random access memory is addressed, said means controlled by said range gate signal being sensitive to said high logic state whereby a detected video signal preceding or following said range gate signal an amount of time not greater than one-half the duration of said range gate signal is effective to prevent storage by said second memory means for detected video signals thereafter appearing.

* * * * *